UNITED STATES PATENT OFFICE.

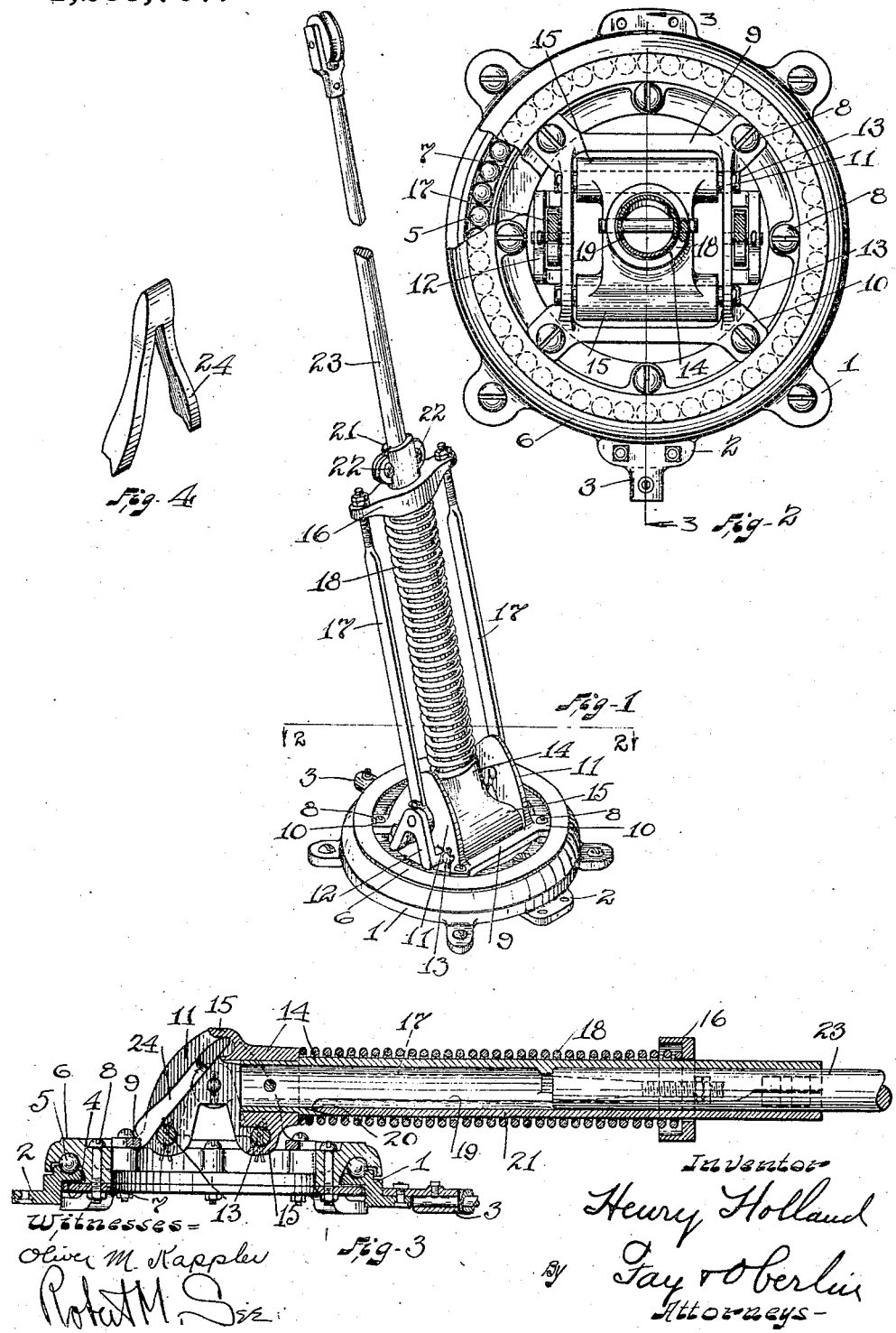

HENRY HOLLAND, OF CLEVELAND, OHIO.

TROLLEY-SUPPORT.

1,285,707.

Specification of Letters Patent.  Patented Nov. 26, 1918.

Application filed October 6, 1913.  Serial No. 793,510.

*To all whom it may concern:*

Be it known that I, HENRY HOLLAND, a citizen of the United States, and a resident of Cleveland, county of Cuyahoga and State of Ohio, have invented a new and useful Improvement in Trolley-Supports, of which the following is a specification, the principle of the invention being herein explained and the best mode in which I have contemplated applying that principle, so as to distinguish it from other inventions.

The present invention relates to trolley supports of the type employing an oscillatory frame to which the trolley pole is connected so as to be pivotal on alternative axes. The present invention provides several improvements in the construction of trolley supports of that general type. To the accomplishment of the foregoing and related ends, said invention, then, consists of the means hereinafter fully described, and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Figure 1 is a perspective view of a support embodying the invention; Fig. 2 is a section on the line 2—2 in Fig. 1; Fig. 3 is a central longitudinal section with certain parts in different positions than in Figs. 1 and 2, the plane of the section being indicated by the line 3—3 in Fig. 2; and Fig. 4 is a perspective view of a retainer.

The support comprises a base 1 which is fixedly secured to the top of the car, and the base is provided with preferably two lugs 2, to either of which a terminal 3 may be secured. The conductor leading to the controller will be secured in the terminal 3 and consequently if the conductor fuses in the terminal it is only necessary to detach the terminal from the lug 2 and drill out the terminal. The base 1 is provided with a downwardly presented annular surface 4 and with an upwardly presented anti-friction bearing 5, the base being preferably formed with an inwardly directed annular flange to provide both the downwardly presented surface and the surface for the anti-friction bearing.

An oscillatory stand 6 is supported by the anti-friction bearing 5, and a flange 7 is secured to its under side by a plurality of securing devices such as bolts 8. It will be noted that when the flange 7 is bolted to the stand 6 they are both secured in position on the base and that the stand can be removed to expose the bearing by merely removing the bolts 8. The depth of the stand is such that, when it with its flange is secured in position on the base, the stand and flange together will be capable of a very slight tipping movement, but insufficient to materially affect the efficiency of the anti-friction bearing.

A frame 9 is fixedly secured to the stand 6 by the bolts 8 which project through lugs 10 and thus serve to secure both the frame 9 and the flange 7 to the stand 6. The number of bolts 8 securing the flange to the stand is greater than the number of lugs 10 by which the frame is secured to the stand, and consequently the frame can be secured to the stand in various positions relative to the axis of oscillation.

The frame 9 is provided with two laterally spaced standards 11, with two arms 12 outside the respective standards, and with two spaced transverse bearings 13, which are preferably rods secured in the standards 11. A trolley supporting sleeve 14 is provided on opposite sides of its lower end with two bearings 15, preferably grooves, and the two bearings 15 are spaced apart longitudinally of the trolley supporting sleeve. A collar 16 is slidable on the trolley supporting sleeve 14 and is adjustably connected with the frame 9 by rods 17 which are pivoted at their lower ends between the standards 11 and the respective arms 12. A spring 18 abuts at its lower end against a shoulder in the trolley supporting sleeve and at its upper end against the collar 16, and the spring forces downwardly upon the trolley supporting sleeve. The trolley supporting sleeve is formed in its wall with a slot 19 extending from the upper end of the sleeve to near its lower end and being beveled at its lower end as shown at 20. A clamp 21 fits in the slot and has its lower end beveled to coöperate with the bevel 20 at the lower end of the slot, so that when it is forced down and secured to the sleeve 14 by bolts 22 passing through alined lugs 25 on the members 14 and 21, it will be bent toward the interior of the sleeve 14 and thereby securely hold the trolley pole in position in the sleeve.

When the parts are in assembled position the spring 18 will normally hold the trolley supporting sleeve down so that both bearings 15 will engage the respective bearings 13 on the frame, and since one of the bearings 15 is longitudinally spaced from the other, the sleeve and pole will be held in the inclined position illustrated in Fig. 1. As a consequence of this normally inclined position of the pole, if the pole strikes a cross wire or other obstruction it will not be broken by a transverse strain because the pull exerted on the inclined trolley will swing the oscillatory stand and thus relieve the strain. The trolley supporting sleeve may pivot alternatively on either of the bearings 13, and consequently on whichever bearing it be pivoted the spring will be placed under increased tension and will hold the sleeve to its bearing on the frame and tend to restrain the pivotal movement of the sleeve.

Irrespective of which of the two bearings the sleeve be pivoted on, the anti-friction bearing will take the down thrust below the sleeve and the slight tipping movement of the stand and its flange will force the flange, in the arc opposite the portion of the bearing which is taking the thrust, into very intimate contact with the downwardly presented annular surface of the fixed base. It is obvious that little current will pass from the pole to the base and hence to the controller through the anti-friction bearing, because the elements of that bearing theoretically have only line contact with the base and stand. Consequently the contact of the upper face of the flange with the downwardly presented surface of the base must be depended upon to establish the electrical flow from the trolley to the controller, and when the trolley is swung downwardly on one of its pivotal bearings in order that it may engage the conductor wire a portion of the flange will be brought into contact with the base with such force that the contact will be very effective. The wear produced on the flange by this constant contact of the relatively movable flange and base will be confined to a limited portion of the flange because the trolley, which is in fixed relation to the flange, will normally be inclined backwardly.

When the wear on a given portion of the flange has become excessive the frame will be changed in position on the stand by securing its lugs to the stand by different bolts 8, and consequently an unworn portion of the flange will be subjected to contact with the base. The frame can be secured to the stand in several successive positions so that the flange will eventually be worn uniformly throughout its extent.

The standards 11 are so proportioned that they will laterally embrace the bearings 15 on the trolley supporting sleeve in all their positions during the pivotal movement of the sleeve, and consequently a dragging rope or wire cannot get between the bearing 13 and the uplifted bearing 15. When it is desired to lock the trolley in tilted position a forked retaining member 24 may be placed with its forked ends against the frame 9 and with its upper end in the uplifted bearing 15, whichever one it may be, and the tension of the spring will securely hold the retaining member in position.

Most of the operative advantages of my improved construction have been pointed out in connection with the foregoing description. However, especial attention is called to the arrangement whereby an extended superficial contact is obtained between the moving parts through which the current requires to be conducted; also to the peculiar wedging action of the split or clamping section of the sleeve in which the trolley pole is held whereby such pole is released when the clamping section is loosened, even though it may have become bent as is frequently the case. The assembly of the base, moreover, is such that as the ball races of the anti-friction bearing become worn in one place, due to the continuous application of pressure in the normal use of the trolley, such race may be shifted a one-eighth turn at a time, thus bringing new wearing surfaces into play. The foregoing and other operative effects render my improved trolley support very satisfactory and durable in use without any undue complexity being involved in its construction.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a trolley support, the combination of a base having an inwardly extending annular flange, the upper face of said flange being grooved and having the outer edge higher than the inner edge, such grooved face forming an anti-friction bearing, the lower face of the flange presenting an annular ring; a revoluble stand supported on such bearing and having its under surface formed to fit over said base thereby inclosing said bearing and adapted to have a slight oscillatory movement; a frame removably connected to said stand and having an annular flange adapted to lie below such annular ring on said base; a plurality of devices for securing said frame to said base in alternative positions, such annular ring and flange being adapted to contact upon slight oscillation of said stand; and a trolley pivotally connected to said stand.

Signed by me this 4th day of October, 1913.

HENRY HOLLAND.

Attested by—
 H. B. FAY,
 JNO. F. OBERLIN.

Copies of this patent may be obtained for five cents each, by addressing the "Commissioner of Patents, Washington, D. C."